United States Patent [19]
Wagner

[11] 3,852,042
[45] Dec. 3, 1974

[54] CATALYTIC CONVERTER WITH EXHAUST GAS MODULATING CHAMBER FOR PREVENTING DAMAGE TO CATALYST SUBSTRATE

[75] Inventor: Melvin H. Wagner, Palatine, Ill.

[73] Assignee: Universal Oil Products Company, Des Plaines, Ill.

[22] Filed: Jan. 29, 1973

[21] Appl. No.: 327,367

[52] U.S. Cl. ............................... 23/288 F, 60/299
[51] Int. Cl. .......................... F01n 3/14, B01j 9/04
[58] Field of Search ....... 60/299; 23/288 F; 138/140

[56] References Cited
UNITED STATES PATENTS

| | | | |
|---|---|---|---|
| 2,063,325 | 12/1936 | McLeod | 138/140 |
| 2,928,492 | 3/1960 | Nelson | 23/288 F |
| 3,201,206 | 8/1965 | Wawrziniok | 23/288 F |
| 3,247,665 | 4/1966 | Behrens | 60/299 |
| 3,248,188 | 4/1966 | Chute | 23/288 F |
| 3,441,382 | 4/1969 | Keith et al. | 23/288 F |
| 3,556,735 | 1/1971 | Epelman | 23/288 F |
| 3,572,391 | 3/1971 | Hirsch | 138/37 |
| 3,649,215 | 3/1972 | Perga et al. | 60/299 |
| 3,692,497 | 9/1972 | Keith et al. | 23/288 F |
| 3,719,457 | 3/1973 | Nagamatsu | 60/299 |

FOREIGN PATENTS OR APPLICATIONS
1,184,202  10/1957  France ............................... 60/299

Primary Examiner—Barry S. Richman
Assistant Examiner—Bradley Garris
Attorney, Agent, or Firm—James R. Hoatson, Jr.; Barry L. Clark; William H. Page, II

[57] ABSTRACT

Catalytic converter incorporates elements for supporting a ceramic, honeycomb type, catalyst substrate and protecting it from damage caused by exhaust gas pulsations and variations in thermal expansion between the substrate and the metal casing which supports it. A pair of spaced, dome-shaped, perforated screens positioned between the converter inlet and the catalyst substrate serve to dampen out and modulate the exhaust gas pulsations. The screens are spaced by a spacing element having a greater coefficient of thermal expansion than the converter causing so that compression forces will be maintained on the substrate, which has a low expansion coefficient, as the converter housing is heated.

10 Claims, 2 Drawing Figures

PATENTED DEC 3 1974　　　　　　　　　　　　　　　　3,852,042

CATALYTIC CONVERTER WITH EXHAUST GAS MODULATING CHAMBER FOR PREVENTING DAMAGE TO CATALYST SUBSTRATE

BACKGROUND OF THE INVENTION

The invention relates to catalytic converters for removing noxious elements from the exhaust gas stream of an internal combustion engine and more particularly to catalytic converters of the type wherein the catalyst is applied as a coating to a multichanneled ceramic element commonly referred to as a honeycomb element. An example of such a catalytic converter wherein the ceramic element is retained against axial movement by a pair of annular flanges in the cylindrical metal converter housing can be seen in U.S. Pat. No. 3,441,381. It has been discovered in use tests of converters such as that disclosed in the aforementioned patent wherein integral metal housing flanges contact the ceramic that the ceramic element tends to chip and break apart where it touches the housing flanges. The chipping seems to be caused by vibrations which occur during use and which drive the ceramic element axially back and forth against the flanges. The principal source of the vibrations appears to be the pulsations of the exhaust gases which are produced intermittently when the engine exhaust valves are open. For an eight cylinder engine operating at 1,500 r.p.m., there are 6,000 exhaust pulses per minute. The pulsating impingement of the exhaust gases on the ceramic element can be quite detrimental, especially when the ceramic element is free to move in the housing as is normally the case as the converter heats up, since the coefficient of thermal expansion of the ceramic element is far less than that of the metal housing. Commonly available ceramic honeycomb elements have a coefficient of thermal expansion of about 0.7 to $2.1 \times 10^{-6}/°F$ as compared to about $7.0 \times 10^{-6}/°F$ for Series 409 stainless steel, an alloy commonly used for the housing.

A mounting structure representing a considerable improvement over the structure of U.S. Pat. No. 3,441,381 is shown in co-pending U.S. Pat. application Ser. No. 285,980, filed Sept. 5, 1972 and assigned to a common assignee. The improved mounting structure includes a pair of insulating rings on each end of the honeycomb element which help keep the housing cooler so that it expands less while at the same time keeping the fragile ceramic away from metal surfaces which would erode it. The improved mounting disclosed in the aforementioned co-pending application does not, however, protect the ceramic indefinitely since pulsating gases are still applied to its surfaces and a degree of movement due to differences in thermal expansion coefficients still takes place.

SUMMARY OF THE INVENTION

It is among the objects of the present invention to provide a mounting for a honeycomb ceramic element in a catalytic converter housing which will protect the ceramic element against damage caused by pulsing gases impinging on its inlet surface as well as from damage caused by loosening of the fit between the ceramic and its housing with temperature increases during operation.

These and other objects are attained by the apparatus of the present invention wherein a ceramic element is mounted near one end of a cylindrical metal housing while a pair of perforated, spaced, dome shaped metal screens are mounted near the other end of the housing. The screens define a gas expansion and modulating chamber which permits the pulsating input gases to the chamber to be expelled evenly at a generally uniform pressure against the catalytic element. The chamber also aids in diffusing the gases, which enter the converter through a relatively narrow inlet opening, so that they uniformly contact the much larger diameter surface of the catalytic element. The spacer element which is used to separate the pair of screens is an annular channel member which is made of a metal having a higher coefficient of expansion than the metal of the housing. For example, the spacer element may be made of Series 321 stainless steel having a thermal expansion coefficient of about $11.5 \times 10^{-6}/°F$ whereas the housing may be made of Series 409 stainless steel having a thermal expansion coefficient of about $7.0 \times 10^{-6}/°F$. Since the ceramic element, depending upon the supplier, has an expansion coefficient of about 0.7 to $2.1 \times 10^{-6}/°F$., it will be obvious that placing the high expansion coefficient spacer member in axial series with the ceramic element will tend to match the combined expansion of the spacer and ceramic element to the expansion of the housing which provides the end support for the spacer screens and ceramic element. Thus, the ceramic element can be maintained in a relatively tight fit against the housing such that it will not vibrate axially and break apart during use.

DESCRIPTION OF THE PREFERRED EMBODIMENT

Figure 1:
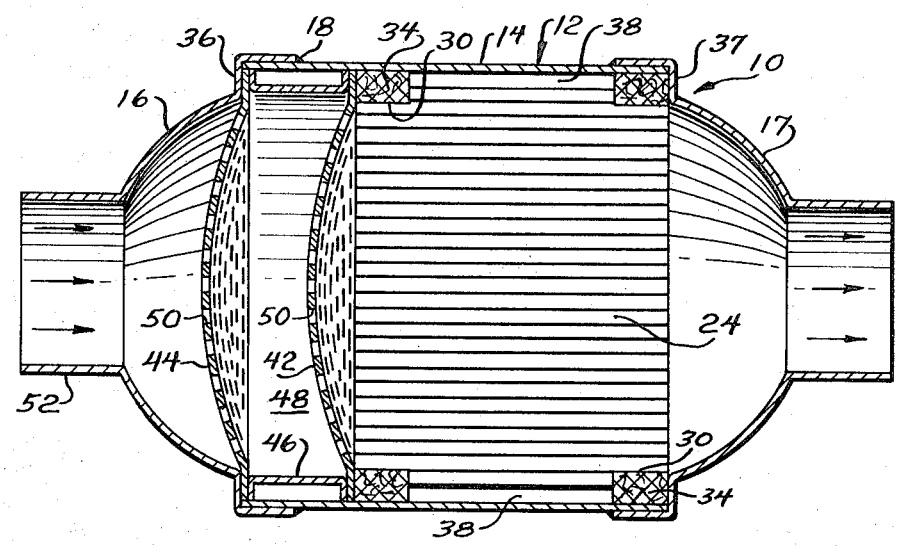
FIG. 1 is a side sectional view of the improved catalytic converter taken on line 1—1 of FIG. 2.
Figure 2:
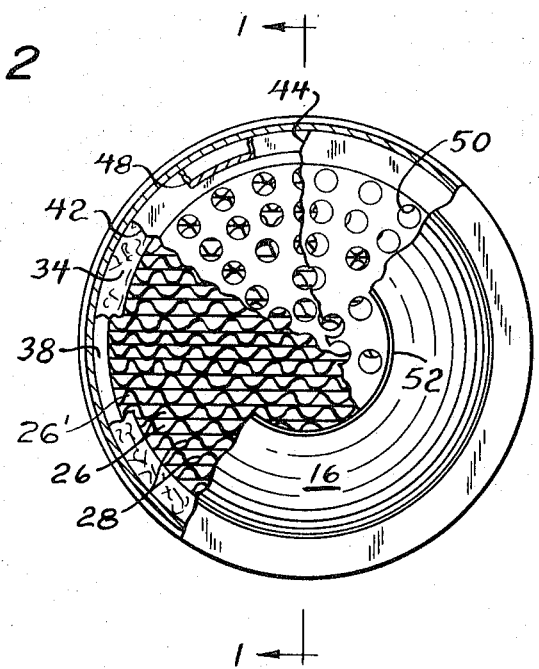
FIG. 2 is a partially broken away end view of the converter of FIG. 1 showing its several layers.

Referring to the drawings, a catalytic converter indicated generally at 10 includes a housing 12 comprising a cylindrical center member 14 and a pair of end members 16 and 17 welded thereto at 18. The end members 16 and 17 are adapted to be placed in the exhaust line of an internal combustion engine (not shown) or other source of polluting gases with the gases entering at end 16 and exiting at end 17. A honeycomb type ceramic catalytic element 24 is mounted within the housing 12. The element 24 includes a plurality of axial pores or openings 26, the surfaces of which are coated with a catalyst 28. The ceramic element 24 is grooved at 30 to form shouldered recesses which are adapted to receive insulating rings 34 made of a flame resistant, high temperature material such as long fiber ceramic wool. To prevent axial movement of the rings 34 and the ceramic element 24 carried thereby relative to the housing 12, shoulders 36, 37 are formed in the housing end members 16, 17. Since the insulating rings 34 are of greater radial thickness than the depth of grooves 30, the element 24 is spaced from the housing member 14 by an air space 38. The grooves 30 intersect an annular ring of pores 26' located at the periphery of the element 24 while the insulating rings 34 cover the pores 26' and prevent exhaust gases from passing through those pores. By blocking the passage of exhaust gases though the pores 26' and by defining a closed air space 38, the insulating rings 34 are able to quite effectively insulate the ceramic element 24 from the housing member 14 and thereby insure that the exhaust gases from a cold engine will be able to quickly heat the catalyst 28 to a temperature sufficiently high for it to become active.

The insulating ring 34 which is closest to housing shoulder 36 is axially spaced from that shoulder by dome-shaped metal screen members 42, 44 and an annular, channel-shaped spacing ring member 46. A gas expansion and modulating chamber 48 is defined by the spacer ring 46 and the screens 42, 44. The screens 42, 44 include perforations 50 through which gases entering the converter from inlet pipe opening 52 pass. The open area of the screens 42, 44 is preferably at least 50% greater than the area of the inlet opening 52. As previously discussed, the screens 42, 44 and the chamber 48 defined by them serve to distribute the exhaust gases fairly uniformly to the inlet face of the ceramic honeycomb element 24. These elements also serve to even out the pulsations of the exhaust gases entering the converter so that the gases impinge upon the inlet face of the honeycomb element 24 at a generally uniform pressure. Due to the presence of the screens 42, 44 and the chamber 48, the energy of the exhaust gas pulses is considerably dissipated and the maximum gas velocity in any of the honeycomb passages 26 is much less than if the screens were not present, since, in the absence of the screens the flow would tend to channel through the center of the honeycomb element. Thus, the honeycomb element is protected against the force of the exhaust gas pulses and is also better utilized since the exhaust gases are more uniformly distributed to the individual honeycomb channels.

The annular spacer ring member 46 is preferably formed of an alloy, such as Series 321 stainless steel, which has a relatively high coefficient of thermal expansion. The housing 12 is preferably formed of an alloy, such as Series 409 stainless steel, which has a lower coefficient of thermal expansion. The ceramic element 24 has a lower coefficient of thermal expansion than either the spacer ring 46 or the housing 12. Since the high expansion spacer ring 46 is located in series relation with the low expansion ceramic element 24 between housing and shoulders 36, 37, it is obvious that the spacer ring 46 will expand relative to the housing 12 during heating while the ceramic element 24 will shrink relative to the housing. The net result, depending on the coefficients of expansion of the materials chosen, and their axial lengths, is that the axial movement which is possible between the ceramic element 24 and the housing 12 when heating takes place can be reduced considerably or entirely eliminated.

I claim:

1. In a catalytic converter for treating exhaust gases from an internal combustion engine and having a metal housing including inlet and outlet means including fittings adapted to receive an exhaust conduit and an axially porous, catalyst coated ceramic element therein, the improvement comprising at least one transversely positioned perforated metal inlet screen positioned intermediate said inlet fitting and said ceramic element, elongated spacer means longitudinally movably positioned intermediate said inlet fitting and said ceramic element, for spacing said ceramic element from said inlet means, said spacer means having a higher temperature coefficient of expansion than said metal housing and said housing having a higher temperature coefficient of expansion than said ceramic element, said spacer means and said housing constituting a thermal effect compensating means arranged and constructed so that the relative shrinkage of said ceramic element relative to said housing during heating will be at least partially offset by the relative expansion of said spacer means relative to said housing.

2. A catalytic converter in accordance with claim 1 wherein said at least one perforated metal inlet screen is dome-shaped.

3. A catalytic converter in accordance with claim 1 wherein said housing includes axially spaced, radial retaining elements between which said at least one inlet screen, said spacer element and said ceramic element are axially positioned.

4. A catalytic converter in accordance with claim 1 wherein said spacer element comprises an annular metal channel member.

5. A catalytic converter in accordance with claim 1 wherein said spacer element and said housing are made of different alloys of stainless steel.

6. A catalytic converter in accordance with claim 1 wherein at least two perforated metal inlet screens are positioned intermediate said inlet fitting and said ceramic element.

7. A catalytic converter in accordance with claim 6 wherein at least one of said at least two perforated metal inlet screens is dome-shaped.

8. A catalytic converter in accordance with claim 1 wherein said at least one metal inlet screen is perforated so as to provide an open area larger than the cross sectional area of the inlet fitting.

9. A catalytic converter in accordance with claim 8 wherein at least two perforated metal inlet screens are positioned intermediate said inlet fitting and said ceramic element, each of said screens being perforated so as to provide an open area larger than the cross-sectional area of the inlet fitting.

10. A catalytic converter in accordance with claim 2 wherein said screens are perforated to provide an open area about 50 percent greater than the cross-sectional area of the inlet fitting.

* * * * *